United States Patent Office 3,728,319
Patented Apr. 17, 1973

3,728,319
REACTION PRODUCTS OF POLY N-VINYLPYR-ROLIDONE OR POLY N-VINYLPYRROLIDONES WITH ALKYL SIDE CHAINS AND ORGANIC SECONDARY OR TERTIARY AMINES
Robert J. Kiesel, Chester, N.J., David I. Randall, Easton, and Nathan D. Field, Allentown, Pa., and Stanley Rudoff, Elizabeth, N.J., assignors to GAF Corporation, New York, N.Y.
No Drawing. Filed Feb. 19, 1970, Ser. No. 12,867
Int. Cl. C08f 7/12, 27/00
U.S. Cl. 260—88.1 R                                   8 Claims

ABSTRACT OF THE DISCLOSURE

Amino-alkylated heterocyclic N-vinyl polymers are disclosed. The polymers are the reaction product of polyvinyl pyrrolidone, alkylated polyvinyl pyrrolidone, or N-vinylpyrrolidone with a saturated secondary or tertiary amine. The product can be prepared by reacting the polyvinylpyrrolidone or alkylated polyvinyl pyrrolidone with amine in the presence of a suitable solvent and a free radical initiator. Alternatively, monomeric N-vinylpyrrolidone can be simultaneously polymerized and amino-alkylated.

---

This invention relates to a new class of amino-alkylated polymers and to the process of preparing the same. More particularly, this invention relates to amino-alkylated polyvinylpyrrolidones and to the methods of their preparation.

Various alkylated polyvinylpyrrolidones are known as are certain uses for the same. These polymers exhibit certain characteristics, such as controllable solubility in hydrophobic and hydrophillic systems which make them particularly useful in many areas. Certain alkylated polyvinylpyrrolidones are used in aerosol hair sprays when compounded with other materials. Highly alkylated polymers of N-vinyl lactams are also useful as sludge dispersants and viscosity index improvers in lubricating oils. Additionally, uses have been found for these alkylated polymers in various cosmetic compositions and other toiletry preparations.

Another use for the alkylated polymers of heterocyclic N-vinyl monomers has been found in electrostatic toner compositions. Such compositions comprise an electrically insulating carrier liquid, a pigment or coloring agent, for example carbon black, and the alkylated polymer. Depending on whether the toner compisition is to be negative-working or positive-working other ingredients can also be included. This particular use for the alkylated polymers is described in co-pending U.S. patent applications Ser. No. 738,127, filed June 19, 1968, now U.S. Pat. 3,542,682, issued Nov. 24, 1970, and Ser. No. 743,-592, filed July 10, 1968, now U.S. Pat. 3,542,681, issued Nov. 24, 1970, both in the name of Thomas D. Mutaffis, and commonly assigned herewith.

One method of producing these alkylated polymers is by alkylating homo- or co-polymers of heterocyclic N-vinyl monomers under particular conditions with a peroxide catalyst. This method is described in detail in U.S. Pat. No. 3,417,054, issued Dec. 17, 1968, in the names of Ashot Merijan et al., and which is embodied herein in its entirety by reference.

An alternative method of making the alkylated polymers is described in U.S. Pats. Nos. 3,423,367 and 3,423,-381, both issued Jan. 21, 1969 in the names of Ashot Merijan et al., and both of which are embodied herein in their entirety by reference. Generally, both of these patents describe a method wherein a heterocylic N-vinyl monomer is simultaneously polymerized and alkylated with a particular co-monomer and alkylation material in the presence of a peroxide catalyst.

It should be noted that the alkylated polymers produced in accordance with the methods of the aforementioned U.S. Pats. Nos. 3,417,054, 3,423,367, and 3,423,-381 are, in effect, copolymers of the heterocylic N-vinyl monomer or polymer and the alkylating agent, which alkylating agent contains an alpha unsaturation. There are, therefore, certain limitations inherent in the products due to the need for an unsaturated alkylating material.

It has now been found that amino-alkylated polyvinyl-pyrrolidones can be produced by using a saturated secondary or tertiary amine as the alkylating agent. The thus-produced amino-alkylated poly-vinyl pyrrolidones exhibit improved properties and find particular use as dispersants in electrostatic toners, compared to the alkylated polymers described in the aforementioned co-pending applications Ser. No. 738,127, now U.S. Pat. 3,542,682, and Ser. No. 743,592, now U.S. Pat. 3,542,681. Furthermore, the novel amino-alkylated poly-vinyl pyrrolidones of the present invention are particularly useful as disperse and acid dye receptors for poly-olefins such as polyethylene, polypropylene and polybutene. They are also useful as intermediates for the preparation of polyvinylpyrrolidone containing quaternary compounds and amine oxides.

Accordingly, it is a primary object of the present invention to provide a method of alkylating the pyrrolidone ring with saturated secondary or tertiary amines.

It is another primary object of the present invention to provide a new class of amino-alkylated polyvinylpyrrolidones.

Another object of the present invention is to provide a method of alkylating the pyrrolidone ring of polyvinyl-pyrrolidone with saturated secondary or tertiary amines.

Still another object of the present invention is to provide a method of simultaneously polymerizing N-vinyl-pyrrolidone, alkylating the same, and reacting the same with secondary and tertiary amines.

Yet another object of the present invention is to provide a method of simultaneously polymerizing N-vinyl-pyrrolidone, alkylating the same and reacting the same with secondary and tertiary amines.

A further object of the present invention is to provide a method for reacting alkylated polyvinylpyrrolidones with secondary and tertiary amines.

Other objects and advantages of the present invention will become apparent from the following detailed description thereof.

Broadly, the foregoing objects of the present invention are accomplished by reacting a saturated secondary or tertiary amine with polyvinylpyrrolidone or alkylated polyvinylpyrrolidone, or with N-vinylpyrrolidone or N-vinylpyrrolidone and an alkylating agent as hereinafter described in the presence of a free radical initiator.

The amines which are used in the present invention can be aliphatic tertiary amines wherein the alkyl groups contain at least one carbon atom. Such aliphatic tertiary amines include, but are not limited to:

| | |
|---|---|
| trimethylamine | tributylamine |
| triethylamine | triamylamine |

Furthermore heterocyclic tertiary amines can also be used in the present invention. Such amines include N-substituted pyrrolidines such as N-butylpyrrolidine, N-cyclohexylpyrrolidine, N-phenylpyrrolidine and N-o-tolylpyrrolidine. Other heterocyclic tertiary amines which can be used are N-substituted piperidines and N-substituted morpholines. Other tertiary amines can also be used such as the di-substituted tertiary amines of the following structure:

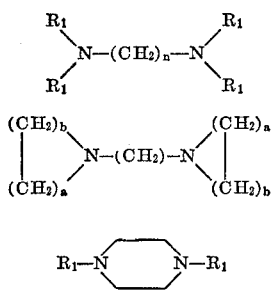

and wherein $R_1$ equals an alkyl group of from one to about 50 carbon atoms, $n$ equals an integer of from two to about 50, $a$ and $b$ equal two or three.

Similarly, aliphatic secondary amines having alkyl groups of from one to about 50 carbon atoms can be used. As with the tertiary amines, the alkyl groups of the secondary amines are not limited as to configuration and can be either straight or branched chain. Furthermore, heterocyclic secondary amines such as pyrrolines can also be employed.

The free radical catalyst used for the reaction of the present invention can be any peroxide which on decomposition gives t-butoxy radicals. Exemplary initiators are:

di-t-butyl peroxide
t-butyl perbenzoate
di-t-butyl perphthalate
t-butyl-pentamethyl-ethyl peroxide
t-butyl-triphenyl-methyl peroxide
2,5-dimethyl-2,5-di (t-butyl-peroxy) hexane
t-butyl hydroperoxide The preferred initiator for the reaction is di-t-butyl peroxide.

The N-vinyl pyrrolidone polymers which may be aminoalkylated to form the polymers of the present invention are the homo-polymers and the copolymers having a K value ranging from about 10 to 140, preferably from about 20 to 100. The homo-polymers are readily obtained by conventional polymerization procedures of N-vinyl pyrrolidone. The copolymers are obtained by copolymerizing 5 to 99 mol percent of the N-vinyl pyrrolidone monomers with 1 to 95 mol percent of a monoethylenically unsaturated polymerizable monomer.

The viscosity co-efficient K, which is fully described in Modern Plastics, 23, No. 3, 157–61, 212, 214, 216, and 218 (1945) is calculated as follows:

$$\frac{\log \eta_{rel}}{c} = \frac{75 K_0^2}{1+1.5 K_{o_0}} + K_0$$

and $$K = 1000 K_0$$

where $c$ is the concentration in grams per 100 ml. of polymer in solution and the $\eta_{rel}$ is the viscosity of the solution compared to solvent.

The various monoethylenically unsaturated polymerizable monomers, which are copolymerized with any one of the aforementioned heterocyclic N-vinyl monomers in the conventional manner and which will yield copolymers that are readily amino alkylated in accordance with the present invention, include α-olefins of from 1 to about 180 carbon atoms, vinyl esters such as vinyl acetate, vinyl propionate, vinyl butyrate, vinyl isobutyrate, vinyl lactate, vinyl caproate, vinyl caprylate, vinyl oleate, and vinyl stearate; acrylonitrile; vinyl ketones; vinyl cyclohexane; styrene; 2-vinylpyridine; 4-vinylpyridine, acrylic acid; acrylate ester monomers of the formula $$CH_2=CHCOOR_2$$

wherein $R_2$ represents either a straight or branched alkyl of from 1 to 18 carbon atoms or an alkoxyalkyl in which the total number of carbon atoms in the alkyl group range from 3 to 6.

Any α-olefin having a molecular weight from about 28 to as high as 2500 may be employed during the copolymerization, alkylation, and amino-alkylation reaction.

In general, α-olefins ranging from ethene (ethylene) to as high as polybutenes having molecular weights from 400 to 2500 may be employed. As examples of such α-olefins the following are illustrative: ethene; propene; 1-butene; 1-pentene; 2-ethyl-1-butene; 2-methyl-1-pentene; 1-hexene; 5-methyl-1-hexene; 2-methyl-1-pentene; 3-ethyl-1-pentene; 1-heptene; 1-octene; 1-nonene; 2-ethyl-1-hexene; 1-decene; 1-dodecene; 1-tetradecene; 1-hexadecene; 1-heptadecene; 1-octadecene; 1-nonadecene; 1-eicosene; 1-docosene; 1-tetracosene; 1-pentacosene; trimerized α-tetradecene and polybutenes of molecular weight of 400 to 2500 may be used.

While linear α-olefins are preferred because of their commercial availability, numerous isomers of α-olefins ranging from 1-pentene to 1-pentacosene as well as polybutenes may be employed in the alkylation reaction. The isomer used must, of course, contain an ethylenic unsaturation in the α-position thereof.

As examples of such acrylate esters the following are illustrative: methyl, ethyl, propyl, isopropyl, butyl, isobutyl, s-butyl, 2-methyl-1-butyl, 3-methyl-1-butyl, 2-ethyl-1-butyl, amyl, 3-pentyl, 2-methyl-1-pentyl, 4-methyl-2-pentyl, hexyl, 2-ethylhexyl, heptyl, 2-heptyl, octyl, 2-octyl, nonyl, 5-ethyl-2-nonyl, decyl, 2-methyl-7-ethyl-4-undecyl, dodecyl, tetradecyl, hexadecyl, octadecyl, 2-methoxyethyl, 2-ethoxyethyl and 2-butoxyethyl acrylate; methacrylic monomers such as methacrylic acid, methyl methacrylate, cyclohexyl methacylate, isobutyl methacrylate, isoamyl methacrylate, β-methoxy ethyl methacrylate and α-(o-chlorophenyl) ethyl methacrylate, β-phenoxy-ethyl methacrylate, α-phenyl-ethyl methacrylate, phenyl methacrylate, o-cresyl methacrylate, p-cyclohexylphenyl methacrylate, 2-nitro-2-methyl propyl methacrylate, diethylaminoethyl methacrylate, ethylidene acetate methacrylate and glycidyl methacrylate, including esters of halo acrylic acids, such as methyl-2-chloroacrylate, ethyl α-chloro-acrylate, phenyl-α-chloroacrylate, α-ethylacrylic acid; methacrylonitrile; N-alkyl and N-aryl substituted acrylamides such as N-methyl acrylamide, N-ethyl acrylamide, N-propyl acrylamide, N-n-butyl acrylamide, N-n-dodecyl acrylamide, N-n-octadecyl acrylamide, N,N-dimethyl acrylamide, N,N-diethyl acrylamide, N,N-di-n-butyl acrylamide, N,N-di-isobutyl acrylamide, N-cyclohexyl, N,N-dicyclohexyl acrylamide, N-phenyl acrylamide, N-acrylamide, N-p-nitro-phenyl acrylamide, N-α-naphthyl acrylamide, N-β-naphthyl acrylamide, N-methyl-N-phenyl acrylamide, N,N-diphenyl acrylamide, N-benzyl acrylamide, N,N-di-benzyl acrylamide; and grafted monomers of the type disclosed in U.S. Pats. 3,029,219; 3,035,009; 3,036,033 and the like.

A mixture consisting of from 5 to 99 mol percent of any one of the foregong N-vinylpyrrolidone and from 1 to 95 mol percent of a different heterocyclic N-vinyl monomer, such as, for example, N-vinyl lactam with either N-vinyl succinimide, N-vinyl-3-morpholinone, and the like, may also be copolymerized and the resulting copolymer alkylated in accordance with the present invention.

Homo-polymers and copolymers of N-vinylpyrrolidone are readily amino-alkylated with saturated secondary or tertiary amines by treating one mol of the homo-polymer or copolymer of N-vinylpyrrolidone with 0.05 to 10 mols of a saturated secondary or tertiary amine as defined hereinabove in solution of an organic solvent common to the polymer and the amine. The reaction is performed in the presence of 0.025 to 1.0 mol of an organic peroxide catalyst, as hereinabove defined, per mol of amine, at a temperature ranging from 80–200° C. for a period of time ranging from 3 to 60 hours. The resulting solution of the amino-alkylated polymer may be employed as such or, if desired, the organic solvent may be removed by vacuum distillation.

Generally, the saturated secondary and tertiary amines can be designated by the formula:

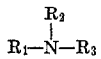

wherein $R_1$ and $R_3$ are alkyl groups of from 1 to about 50 carbon atoms, and $R_2$ is H or an alkyl group of from 1 to about 50 carbon atoms. The saturated heterocyclic secondary and tertiary amines are represented by the formula:

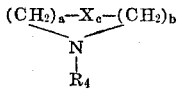

wherein $R_4$ is an H, alkyl or cycloalkyl of from 1 to about 50 carbon atoms, phenyl, or substituted phenyl group; X is O or —N—$R_1$; $c$ is 0 or 1; $a$ and $b$ are 2 or 3; when $c$ is 1, $a$ and $b$ are each 2; and when X is —N—$R_1$, $R_4$ equals $R_1$.

In another aspect of the present invention alkylated polyvinyl pyrrolidone is amino-alkylated by treating 1 mol of the alkylated polymer with 0.05 to 10 mols of a saturated secondary or tertiary amine, as hereinabove defined, in solution of an organic solvent common to the alkylated polymer and the amine in the presence of 0.025 to 0.50 mol of an organic peroxide catalyst, as hereinabove defined, per mol of amine, at a temperature ranging from 80 to 200° C. for a period of time ranging from 3 to 60 hours. The alkylated polyvinylpyrrolidone being treated with the saturated secondary or tertiary amine according to the present invention is prepared in a known manner as disclosed in the aforementioned U.S. Pats. Nos. 3,417,054; 3,423,367; and 3,423,381.

According to still another aspect of the present invention, N-vinylpyrrolidone is simultaneously polymerized and amino-alkylated. In this instance, one mol of N-vinylpyrrolidone is treated with 0.05 to 10 mols of a saturated secondary or tertiary amine in solution of an organic solvent common to the monomer and the amine in the presence of 0.025 to 0.50 mol of an organic peroxide catalyst per mol of amine at a temperature ranging from 80 to 200° C. for a period of time ranging from 3 to 60 hours. Both the amine and the peroxide catalyst are as hereinabove defined.

In all instances, the organic solvent employed is common to all of the starting reactants. Suitable solvents are various alcohols such as methanol, ethanol, propanol, isopropanol, butanol, sec-butanol, amyl alcohol, hexanol, 2-ethyl-1-hexanol, ethylene glycol, 1,2-butanediol, 1,4-butanediol, etc. Other solvents such as diethylene glycol, ethylene glycol monomethyl ether and the like may also be employed. It should be noted that the nature or character of the organic solvent is immaterial so long as it forms a solution with the starting materials, i.e., the amine and the monomer or polymer, and is relatively inert toward alkylation.

Similarly, the amount of inert organic solvent employed is not critical. Any amount which will yield a solution of the starting reactants will suffice. However, for purposes of expediency, it has been found that for every part by weight of N-vinyl pyrrolidone or polyvinyl pyrrolidone from 2 to 10 parts of organic solvent, either by volume or by weight, are sufficient to yield a workable solution.

Furthermore, N-vinyl pyrrolidone can be simultaneously copolymerized and alkylated with α-olefins and amino-alkylated with a saturated secondary or tertiary amine according to the present invention. In this instance, the proportions and reaction conditions are the same as those hereinabove described by reference to the amino-alkylation of N-vinylpyrrolidone, polyvinyl pyrrolidone, and alkylated polyvinylpyrrolidone. In addition to the N-vinylpyrrolidone monomer and the saturated secondary or tertiaryamine, as hereinabove described, there is included an α-olefinic comonomer.

Any α-olefin having a molecular weight from about 28 to as high as 2500 may be employed as the co-monomer and in the alkylation of the active sites in the moieties of the N-vinylpyrrolidone during the simultaneous copolymerization, alkylation, and amino-alkylation reaction.

In other words, α-olefins ranging from ethene (ethylene) to as high as polybutenes having molecular weights from 400 to 2500 may be employed. As examples of such α-olefins the following are illustrative: ethene; propene; 1-butene; 1-pentene; 2-ethyl-1-butene; 2-methyl-1-pentene; 1-hexene; 5-methyl-1-hexene; 2-methyl-1-pentene; 3-ethyl-1-hexene; 1-octene; 1-nonene; 2-ethyl-1-hexene; 1-decene; 1-dodecene; 1-tetradecene; 1-hexadecene; 1-heptadecene; 1-octadecene; 1-nonadecene; 1-eicosene; 1-docosene; 1-tetracosene; 1-pentacosene; trimerized α-tetradecene and polybutenes of molecular weight of 400 to 2500 may be used.

While linear α-olefins are preferred because of their commercial availability, numerous isomers of α-olefins ranging from 1-pentene to 1-pentacosene as well as polybutenes may be employed in the alkylation reaction. The only precaution required in such case is that the isomer contain an ethylenic unsaturation in the α-position thereof.

A mixture of commercially available linear α-olefins produced by cracking petroleum wax or by polymerizing lower olefins may also be used as the co-monomer and alkylating agent. Alpha-olefins in the carbon range of from $C_6$–$C_7$; $C_7$–$C_9$; $C_9$–$C_{11}$; $C_{11}$–$C_{15}$; and $C_{15}$–$C_{20}$ are commercially available and contain from 81 to 87 weight percent of straight-chain α-olefins; from $<0.5$ to 2 weight percent of straight-chain internal olefins; from 13 to 3 weight percent of branched and naphthenic olefins; from 2 to 4 weight percent of paraffins and naphthenes and from 1 to $<1$ of aromatics, respectively. A mixture of α-olefins containing from 65–75% of α-olefins of from $C_{20}$ to $C_{42}$ and having an average molecular weight of 366 is also commercially available and such mixture is employed in the alkylation reaction.

Instead of employing ethylene (ethene) as the comonomer and alkylating agent, monohalo-α-olefins and polyhalo-α-olefins of at least 2 carbon atoms (hereinafter referred to simply as halo-α-olefins) such as, for example, dichlorovinylidene fluoride ($CCl_2=CF_2$), chlorovinylidene fluoride ($CHCl=CF_2$), chlorotrifluoroethylene $$(CClF=CF_2),$$

tetrafluoroethylene ($CF_2=CF_2$), tetrachloroethylene $$(CCl_2=CCl_2),$$

vinylidene fluoride ($CH_2=CF_2$), vinylidene bromochloride, i.e., 1-bromo-1-chloroethylene ($CH_2=CBrCl$),
vinylidene bromofluoride ($CH_2=CBrF$),
vinylidene chlorofluoride ($CH_2=CClF$),
1,2-dichloro-1,2-difluoroethylene ($CClF=CClF$),
1,2-difluoroethylene ($CHF=CHF$),
1-chloro-2-fluoroethylene ($CHF=CHCl$),
1-bromo-2-fluoroethylene ($CHF=CHBr$),
1-dichloro-2-fluoroethylene ($CHF=CCl_2$),
1-bromo-1,2-difluoro-ethylene ($CHF=CBrF$),
1-dibromo-2-fluoroethylene ($CHF=CBr_2$),
trichloroethylene ($CHCl=CCl_2$),
1-chloro-1,2-dibromoethylene ($CHBr=CBrCl$),
trifluoroethylene ($CF_2=CHF$),
tribromoethylene ($CHBr=CBr_2$),
1-bromo-2-difluoroethylene ($CF_2=CHBr$),
1-chloro-1-bromo-2-difluoroethylene ($CF_2=CBrCl$),
1-dibromo-2-difluoroethylene ($CF_2=CBr_2$),
1-bromo-2-fluoroethylene ($CHF=CHBr$),
1-chloro-2-difluoroethylene ($CF_2=CHCl$),
1-dichloro-2-difluoroethylene ($CF_2=CCl_2$), chlorotrifluoroethylene ($CF_2=CClF$),
bromotrifluoroethylene ($CF_2=CBrF$),
fluorotrichloroethylene ($CCl_2=CClF$),
trichloroiodoethylene ($CCl_2=CClI$),
chlorodiiodoethylene ($CHCl=CI_2$),
1,2-dichloro-1,2-diiodoethylene ($CClI=CClI$),
1-bromo-2-iodoethylene ($CHI=CHBr$),
1-iodo-2-chloroethylene ($CHCl=CHI$),
allyl chloride ($CH_2=CH-CH_2Cl$),
4-chloro-1-butene ($CH_2=CH-CH_2-CH_2Cl$),
3,3,4,4,4-pentafluoro-1-butene ($CH_2=CH-CF_2-CF_3$),
5-chloro-1-pentene ($CH_2=CH-CH_2-CH_2-CH_2Cl$),
3,3,4,4,5,5,5-heptafluoro-1-pentene $$(CH_2=CH-CF_2CF_2CF_3),$$

3,3,4,4,5,5,6,6,6-nonafluoro-1-hexene $$(CH_2=CH-CF_2-CF_2-CF_2-CF_3),$$

etc.

may be used to yield a series of a new class of monohaloalkylated and polyhaloalkylated copolymers of heterocyclic N-vinyl monomers.

It is to be noted that both the carbon chain length and the number of halogen substituents on the carbon atoms of the above halo-α-olefins are immaterial so long as the monohalo- and polyhalo-α-olefins contains an ethylenic unsaturation in alpha-position. Accordingly, the chain length of such halo-α-olefins may range beyond 6 carbon atoms.

Additionally, instead of an α-olefin or a halo-olefin, the comonomer could include vinyl esters such as vinyl acetate, vinyl propionate, vinyl butyrate, vinyl isobutyrate, vinyl lactate, vinyl caproate, vinyl caprylate, vinyl oleate, and vinyl stearate; acrylonitrile vinyl ketones; vinyl cyclohexane; styrene; 2-vinyl pyridine, 4-vinyl pyridine, acrylic acid; acrylate ester monomers of the formula $$CH_2=CHCOOR_2$$

wherein $R_2$ represents either a straight or branched alkyl of from 1 to 18 carbon atoms or an alkoxyalkyl in which the total number of carbon atoms in the alkyl group range from 3 to 6.

As examples of such acrylate esters the following are illustrative: methyl, ethyl, propyl, isopropyl, butyl, isobutyl, s-butyl, 2-methyl-1-butyl, 3-methyl-1-butyl, 2-ethyl-1-butyl, amyl, 3-pentyl, 2-methyl-1-pentyl, 4-pentyl, 4-methyl-2-pentyl, hexyl 2-ethylhexyl, heptyl, 2-heptyl, octyl, 2-octyl, nonyl, 5-ethyl-2-nonyl, decyl, 2-methyl-7-ethyl-4-undecyl, dodecyl, tetradecyl, hexadecyl, octadecyl, 2-methoxyethyl, 2-ethoxyethyl and 2-butoxyethyl acrylate; methacrylic monomers such as methacrylic acid, methyl methacrylate, cyclohexyl methacrylate, isobutyl methacrylate, isoamyl methacrylate, β-methoxy ethyl methacrylate and α-(o-chlorophenyl) ethyl methacrylate, β-phenoxyethyl methacrylate, α-phenylethyl methacrylate, phenyl methacrylate, o-cresyl methacrylate, p-cyclohexylphenyl methacrylate, 2-nitro-2-methyl propyl methacrylate, diethylaminoethyl methacrylate, ethylidene acetate methacrylate and glycidyl methacrylate, including esters of halo acrylic acids, such as methyl-2-chloro-acrylate, ethyl α-chloroacrylate, phenyl - α-chloro-acrylate, α-ethylacrylic acid; methacrylonitrile; N-alkyl and N-aryl substituted acrylamides such as N-methyl acrylamide, N-ethyl acrylamide, N-propyl acrylamide, N-n-butyl acrylamide, N-n-dodecyl acrylamide, N-n-octadecyl acrylamide, N,N-dimethyl acrylamide, N,N-diethyl acrylamide, N,N-di-n-butyl acrylamide, N,N-di-isobutyl acrylamide, N-cyclohexyl, N,N-dicyclohexyl acrylamide, N-phenyl acrylamide, N-acrylamide, N-p-nitro-phenyl acrylamide, N-α-naphthyl acrylamide, N-β-naphthyl acrylamide, N-methyl-N-phenyl acrylamide, N,N-diphenyl acrylamide, N-benzyl acrylamide, N,N-dibenzyl acrylamide; and grafted monomers of the type disclosed in U.S. Pats. 3,029,219; 3,035,009; 3,036,033 and the like.

EXAMPLE 1

A solution was made of 55.5 grams (0.5 mol) of N-vinyl pyrrolidone and 50.5 grams (0.5 mol) of triethylamine in 56 grams of isopropanol. Di-t-butyl peroxide (33 grams, 0.225 mol) was added and the solution was charged to a 300 ml. rocker bomb.

The bomb was sealed and heated with shaking at 130–140° C. for 10 hours. The bomb was then cooled to 50° C. and discharged. The volatiles were removed in vacuo to a final drying temperature of 100–110° C. at 5 mm. of mercury for several hours. The product was a cream colored solid weighing 65 grams and analyzed by acid titration for 1.65 meq. amine per gram of product, equivalent to the incorporation of 35.0% triethylamine. The relative viscosity in 1% isopropanol was 1.148. The K value was 22.7. The product was soluble in ethanol, isopropanol and acetone, but insoluble in toluene, petroleum ether and Perclene®. The IR carbonyl appeared at 1655 cm.$^{-1}$ in KBr.

EXAMPLE 2

A 300 ml. rocker bomb was evacuated and charged with a solution of the following:

N-vinylpyrrolidone=55.5 grams (0.5 mol)
α-Eicosene=14 grams (0.03 mol)
Isopropanol=56 grams
Trimethylamine=22 grams (0.36 mole)
Ditertiary butyl peroxide=22 grams (0.15 mol)

The bomb was sealed and heated with shaking at 130–140° C. for 12 hours. The bomb was cooled to 50° C. and discharged. Titration for unsaturation indicated 10% by weight unconverted eicosene. The volatiles were removed in vacuo to a final drying temperature of 100–110° C./5 mm. for several hours. The product was a cream colored solid and weighed 68 grams, which by acid titration analyzed for 0.73 meq. amine/gram of product, equivalent to the incorporation of 14.6% trimethylamine. Relative viscosity (1% i-PrOH) 1.166; K value 24.2; soluble in ethanol, isopropanol, acetone; insoluble in toluene, petroleum ether and Perclene®. IR carbonyl at 1655 cm.$^{-1}$ (KBr).

EXAMPLE 3

A 300 ml. rocker bomb was evacuated and charged with a solution of the following:
Ganex V-816*=69 grams (0.5 mol)
Isopropanol=69 grams
Pyrrolidine=21 grams (0.3 mol)
Ditertiary butyl peroxide=33 grams (0.25 mol)

The bomb was sealed and heated with shaking at 130–140° C. and discharged. The volatiles were removed in vacuo to a final drying temperature of 100–110° C./5 mm. for several hours. The product was a colored solid and weighed 76 grams, which analyzed on acid titration for an amine content of 0.65 meq. amine/gram of product, equivalent to the incorporation of 13.6% pyrrolidine. Relative viscosity (1% i-PrOH) 1.204; K value 27.2, soluble in ethanol, isopropanol and acetone; insoluble in toluene, petroleum ether and Perclene®**. IR carbonyl at 1655 cm.$^{-1}$ (KBr).

EXAMPLE 4

A 300 ml. rocker bomb was evacuated and charged with a solution of the following:

N-vinylpyrrolidone=55.5 grams (0.5 mol)
Isopropanol=56 grams
Tributylamine=20 grams (0.112 mol)
Ditertiary butyl peroxide=33 grams (0.25 mol)

---
*Alkylated polyvinylpyrrolidone (GAF Corp.).
**Perchloroethylene (Tech. gr. Du Pont).

The bomb was sealed and heated with shaking at 130–140° C. for 12 hours. The bomb was cooled at 50° C. and discharged. The volatiles were removed in vacuo to a final drying temperature of 100–120° C./5 mm. for 3 hours. The product was a light yellow colored solid which weighed 72 grams. Analysis by acid titration showed an amine content of 0.80 meq. amine/gram of product, equivalent to the incorporation of 23.6% tributylamine. Relative viscosity (1% i-PrOH) 1.181; K value 25.4; soluble in ethanol, isopropanol and acetone; insoluble in toluene, petroleum ether and Perclene®; IR carbonyl at 1655 cm.$^{-1}$ (KBr).

EXAMPLE 5

Into a one-liter, four-necked flask equipped with stirrer, thermometer, nitrogen inlet and reflux condenser, the following materials were charged:

N-vinyl-2-piperidone=125 grams (1.0 mole)
a-Octadecene=252 grams (1.0 mole)
Triethylamine=101 grams (1.0 mole)
Normal butanol=200 grams
Di-t-butyl peroxide=14.6 grams (1.1 moles)

The flask was purged thoroughly with nitrogen and heated. The contents were maintained at reflux (120° C. pot) for 30 hours and then cooled and analyzed. The analyses showed the total absence of N-vinyl-2-piperidone and the presence of only 3.05% by weight of solution of unreacted a-octadecene, corresponding to 92.9% of a-octadecene consumed in the reaction. Analysis of acid titration showed an amine content of 0.75 meq./gm. of product.

When all solvent and volatiles were stripped in vacuum, a clear viscous fluid weighing 451 grams was obtained.

|  | Percent |
|---|---|
| The mole percent of a-octadecene copolymerized and alkylated | 88.26 |
| Min. mole percent of a-octadecene copolymerized | 1.0 |
| Min. mole percent of N-vinyl-2-piperidone moieties alkylated on the average | 78.26 |

The N-vinyl-2-piperidone moieties in the copolymer that were alkylated on the average showed the following isomeric distribution.

| Position substitution: | Percent |
|---|---|
| Octadecyl in 3-position | 60–70 |
| Octadecyl in 6-position | 25–20 |
| Octadecyl in α-vinyl carbon atom | 15–10 |

EXAMPLE 6

(Simultaneous polymerization and alkylation of N-vinyl pyrrolidone with N-butylpyrrolidine)

A one liter stainless steel rocker bomb was purged with nitrogen and charged with a solution of the following:

N-vinyl pyrrolidone=167 g. (1.5 moles)
N-butyl pyrrolidine=85.7 g. (0.675 mole)
Isopropanol=167 g.
Di-tertiary butyl peroxide=99 g. (0.675 mole)

The bomb was sealed and heated with shaking at 130–140° C. for 14 hours. The bomb was cooled to 50° C. and discharged. The volatiles were removed in vacuo to a final drying temperature of 110° C./5 mm. for several hours. The product was a yellow orange colored solid which weighed 221 grams. Analysis by acid titration for amine content indicated 1.20 meq. amine/gram, equivalent to the incorporation of 28.6% N-butyl pyrrolidine.

Relative viscosity (1% i-PrOH) 1.209: K value 27.6; soluble in ethanol, isopropanol and acetone; insoluble in toluene, petroleum ether and Perclene®, IR carbonyl at 1655 cm.$^{-1}$ (KBr).

It must be observed that amino-alkylated N-vinyl heterocyclic polymers have previously been prepared from unsaturated primary amines, U.S. patent application 672,449, filed Oct. 3, 1967, now U.S. Pat. 3,494,907, issued Feb. 10, 1970. Until this invention, it was theorized that secondary and tertiary amines would not react with such materials to form their useful products. The products and the reaction of this invention are completely unforeseen on the basis of the known prior art including the aforesaid reaction product with primary amines.

What is claimed is:

1. An amino-alkylated polymer comprising the reaction product of alkylated poly (vinylpyrrolidone) and a secondary or tertiary amine selected from the group consisting of:

(I) 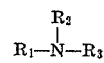

wherein $R_1$ and $R_3$=alkyl of from 1 to about 50 carbon atoms, and $R_2$=H or alkyl or from 1 to about 50 carbon atoms;

(II) 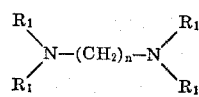

wherein $R_1$ has a value as hereinabove defined, and $n$=an integer of from 2 to about 50;

(III) 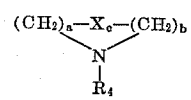

wherein $R_4$=H, alkyl or cycloalkyl, each of from 1 to about 50 carbon atoms phenyl, or substituted phenyl, X=O or —N—$R_1$, $c$=0 or 1, $a$ and $b$=2 or 3, when $c$=1, $a$=$b$=2, and when X=—N—$R_1$, $R_4$=$R_1$; and (IV) 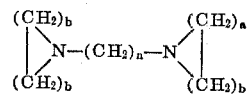

wherein $a$, $b$ and $n$ have values as hereinabove defined.

2. A polymer according to claim 1, wherein said alkylated polyvinylpyrrolidone is a copolymer of N-vinylpyrrolidone and a member of the group consisting of 2-olefins of from 2 to about 180 carbon atoms, acrylamides, acrylic acid and acrylic acid esters, acrylonitrile and methacrylonitrile, methacrylic acid and methacrylic acid esters, vinyl esters, vinyl ketones, vinyl pyridine, vinyl cyclohexane, and styrene.

3. A polymer according to claim 1, wherein said amine is selected from the group consisting of:

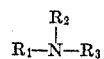

wherein $R_1$ and $R_3$=alkyl of from 1 to about 50 carbon atoms and $R_2$=H or alkyl of from 1 to about 50 carbon atoms.

4. A polymer according to claim 1, wherein said alkylated polyvinyl pyrrolidone is a copolymer of N-vinylpyrrolidone and a member of the group consisting of alpha-olefins of from 2 to about 180 carbon atoms.

5. A process for preparing the polymer as defined in claim 1 comprising reacting said alkylated polyvinylpyrrolidone and said amine in solution of an organic solvent common to said alkylated polyvinylpyrrolidone and said amine, in the presence of a catalytic amount of an organic peroxide catalyst.

6. A process as defined in claim 5 comprising heating about 1 mole of said alkylated polyvinylpyrrolidone and about 0.025 to about 10 moles of said amine, in said solution, in the presence of about 0.025 to about 0.50 mole of said catalyst per mole of said amine, at a temperature of about 80 to about 200° C.

7. The process according to claim 6, wherein said heating is for a time of 3 to 60 hours.

8. The process according to claim 6, wherein said catalyst is di-t-butyl peroxide.

References Cited
UNITED STATES PATENTS

| | | | |
|---|---|---|---|
| 3,494,907 | 2/1970 | Merijan et al. | 260—88.3 L |
| 3,563,968 | 2/1971 | Merijan et al. | 260—88.3 L |
| 2,634,259 | 4/1953 | Ney et al. | 260—88.3 L |

HARRY WONG, JR., Primary Examiner

U.S. Cl. X.R.

252—50; 260—33.2 R, 33.4 R, 41 C, 47 UA, 80.3 R, 80.3 N, 80.72, 82, 85.5 AM, 85.5 S, 85.7, 86.1 N, 87.5 A, 87.5 F, 88.1 PA, 88.3 L, 326.5 FL, 895; 424—47, 78